United States Patent [19]

Kaneko et al.

[11] 4,102,720
[45] Jul. 25, 1978

[54] PROCESS FOR PRODUCING SYNTHETIC RESIN LAMINATES

[75] Inventors: Takafumi Kaneko, Hiroshima; Shuzo Sasagawa, Iwakuni; Noriyuki Ishii, Tokyo; Takashi Hiraoka, Yamaguchi; Shozo Hieda, Otake, all of Japan

[73] Assignee: Mitsui Petrochemical Industries, Ltd., Tokyo, Japan

[21] Appl. No.: 752,005

[22] Filed: Dec. 20, 1976

[30] Foreign Application Priority Data

Dec. 25, 1975 [JP] Japan ............................ 50/153988

[51] Int. Cl.² ............................................ B32B 5/18
[52] U.S. Cl. .................................... 156/78; 156/209; 156/229; 156/290; 156/244.11; 210/164; 264/51; 264/210 R; 264/321; 428/186; 428/188; 428/311

[58] Field of Search .................. 156/78, 229, 209, 244, 156/290; 428/182, 186, 188, 310, 311; 264/51, 53, 210 R, 321; 210/164

[56] References Cited

U.S. PATENT DOCUMENTS

| | | | |
|---|---|---|---|
| 3,682,730 | 8/1972 | Haase | 156/229 |
| 3,906,134 | 9/1975 | Pohl | 156/229 |
| 3,930,917 | 1/1976 | Esakov et al. | 56/78 |

*Primary Examiner*—Edward G. Whitby
*Attorney, Agent, or Firm*—Cooper, Dunham, Clark, Griffin & Moran

[57] ABSTRACT

A synthetic resin laminate composed of a supporting plate having protrusions and a foamed sheet having fine through-holes and fixed to the protrusions is produced by placing a foamed sheet extruded on the protrusions of a supporting plate heated to a temperature suitable for fusion-fixing and applying a draft to the supporting plate at a speed more than, but not exceeding 5 times the speed of the foamed sheet.

6 Claims, 2 Drawing Figures

PROCESS FOR PRODUCING SYNTHETIC RESIN LAMINATES

BACKGROUND OF THE INVENTION

1. Field of the Invention

This invention relates to a process for producing a laminate composed of a synthetic resin supporting plate possessing at least two protrusions in a traverse direction and a synthetic resin foamed sheet fusion-fixed to the protrusion of said synthetic resin supporting plate, and more particularly, to a process for forming numerous fine through-holes in the synthetic resin foamed sheet.

2. Description of the Prior Art

Such laminates as above are disclosed in Japanese Utility Model Application Laid Open Nos. Sho 50-97208 and Sho 50-111109 (laid open in 1975) and can be used as a member for drainage.

SUMMARY OF THE INVENTION

According to the present invention there is provided a process for producing a laminate composed of a synthetic resin supporting plate possessing at least two protrusions in a traverse direction and a synthetic resin foamed sheet having fine through-holes and fusion-fixed to the protrusion of said synthetic resin supporting plate which comprises heating a synthetic resin supporting plate possessing at least two protrusions in a traverse direction to a temperature suitable for fusion-fixing, placing a synthetic resin foamed sheet extruded on the protrusions, and applying a draft to the synthetic resin supporting plate at a speed of more than one time, but not exceeding five times that of the synthetic resin foamed sheet to produce numerous fine through-holes in the synthetic resin foamed sheet.

An object of the present invention is to provide a process for producing synthetic resin laminates composed of a foamed sheet having relatively circular fine opening through-holes and a supporting plate having protrusions, suitable for passing water.

DESCRIPTION OF PREFERRED EMBODIMENT OF THE INVENTION

Figure 1:
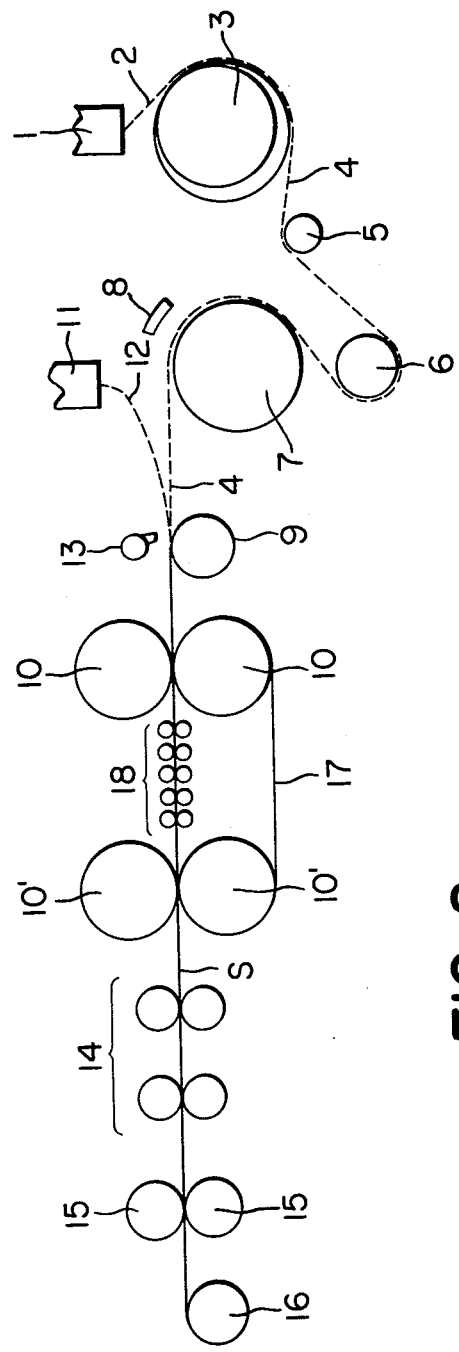
FIG. 1 shows diagrammatically an apparatus which may be used for producing a laminate according to the present invention.

When the foamed synthetic resin is extruded from a T die in a form of sheet, a draft is applied to elongate the foamed sheet by employing a drawing speed faster than the extruding speed. As the result, numerous fine spherical foams produced upon foaming are elongated to become an ellipsoid-like form and the foam wall becomes so thin that the wall becomes easily breakable. On the other hand, when such foamed sheet as above is adhered to the numerous protrusions of the supporting plate, the foamed sheet is prevented from neck-in in the traverse direction and shrinkage upon cooling by the adjacent protrusions. Therefore, the ellipsoid-like foams are pulled in the traversed direction so that fine circular through-holes passing from the surface to the back side of the foamed sheet are produced.

On the contrary, when such foamed sheet as above is adhered to the protrusions according to conventional methods, the independent foams formed by foaming are simply deformed to some extent, but not ruptured so that through-holes are not produced. The laminate thus produced can not be used as a drainage material since water can not pass through it.

According to the present invention, a foamed resin extracted in a form of sheet is cooled from the surface by an air-knife and pressed to the heated protrusion portions of the supporting plate, and thus they are integrated to form a laminate. At this time, i.e., at the time that the foamed resin is pressed on to the supporting plate, the speed of draft roller is more than the speed at which the foamed resin is extruded but not exceeding 5 times the speed of extruding, and preferably, from 1.1 to 2 times the speed of extruding. The foamed resin is cooled after extrusion, but placed on the protrusion portions of the supporting plate while the foamed resin is still soft, and press-adhered to the protrusions by the air-knife.

This press-adhering can prevent the foamed sheet from shrinking in the traverse direction, i.e. neck-in or thermal shrinkage. Therefore, after the foamed sheet is extruded, the foams produced have a thin wall and are deformed to become an ellipsoid-like form, and further, neck-in and thermal shrinkage are prevented at the protrusion portions, and therefore, the foams themselves are ruptured to form numerous fine openings passing through the foamed sheet.

The supporting plate and the foamed sheet are pressed to each other by draft roller to produce a laminate.

The resulting laminate is preheated to be annealed and drawn by drawing rollers and then wound up by a windup roller. The drawing speed of the drawing rollers is controlled to be faster than the speed of press rollers by, for example, about 3% to prevent the slack at the preheating step. The resulting laminate product is uniform as a whole and the resulting fine openings of a through-hole type are relatively circular and uniform over the whole traverse direction.

The protrusions on the supporting plate may be in any optional form. Representative forms are cylindrical protrusion, wave-like protrusion and plate-like rib, which may be produced by embossing with a vacuum roller device, processing with a wave-producing roller device and mounting plate-like ribs using an integral extruding method, respectively. These protrusion portions may be produced optionally in a continuous or discontinuous form as to plane arrangement. If necessary, the supporting plate may be also that which allows water to pass through.

According to the present invention, various optional thermoplastic synthetic resins may be used as the supporting plate, and for example, polyprophylene is one of the preferred resins. Further, the foamed sheet may be made of various optional thermoplastic synthetic resins such as, for example, polypropylene, containing a foaming agent and a foaming auxiliary agent, as far as the foamed sheet material can adhere to the supporting plate material so as to integrate the foamed sheet and the supporting plate. If desired, coloring matters may be incorporated to those thermoplastic resin materials.

Figure 2:
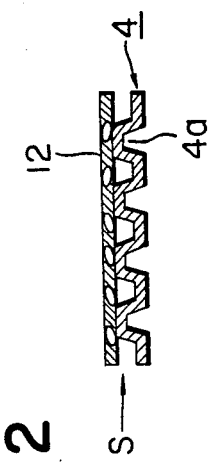
FIG. 2 shows diagrammatically a cross section of a laminate produced according to the present invention.

Now referring to FIG. 1, sheet 2 extruded from extruder 1 is a non-foamed synthetic resin sheet and is subjected to embossing at vacuum shaping roll 3 to form protrusions and thus a synthetic resin supporting plate 4 is produced. The resulting synthetic resin supporting plate having protrusions 4 has protrusions 4a as illustrated in FIG. 2. The synthetic resin supporting plate is guided by guide rollers 5 and 6 and then heated by heating roll 7 and infrared heater 8. Each of such steps may be effected by a known procedure. The synthetic resin supporting plate 4 thus heated to a state suitable for adhering is sent over holding roll 9 while foamed sheet 12 is extruded from another extruder 11, cooled by a cooling device such a air-knife 13 to bring the foamed sheet 12 to a state suitable for press-fixing, then places on protrusions 4a of synthetic resin supporting plate 4 and press-fixed to the protrusions by a pair of draft rollers 10 and 10.

In the embodiment of FIG. 1 the lower draft roller 10 is connected with the lower driving roller 10', which is shaft-driven, by means of rubber belt 17. Between draft rollers 10, 10 and driving rollers 10', 10' there are arranged a plural pairs of idlers 18.

According to the present invention, ratio of the peripheral speed of draft roller 10 to the extruding speed of foamed sheet 12 exceeds 1, but not higher than 5. This speed difference gives draft to foamed sheet 12, and this speed difference causes deformation of the foams in the foamed sheet 12, but does not rupture the foams. Since the foamed sheet 12 is placed on and engaged with the protrusions 4a, the shrinkage in the traverse direction is prevented.

With the peripheral speed of draft roller 10 is not more than the extruding speed of foamed sheet 12, the foams can not be ruptured so that openings can not be produced though shrinkage in the traverse direction is prevented. On the contrary, when the peripheral speed of draft roller 10 is more than five times the speed of extrusion of the foamed sheet 12, the draft is so strong that the foams becomes needle-like foams and fail to rupture and even if they rupture, the resulting openings are very slender.

After foamed sheet 12 is placed on synthetic resin supporting plate 4, the foamed sheet 12 is substantially pulled together with the synthetic resin supporting plate 4 and they are completely press-fixed each other by a pair of draft rollers. FIG. 2 shows a laminate S thus produced where foamed sheet 12 is fixed to top portions of protrusions 4a of synthetic resin supporting plate 4.

The resulting laminate S is preheated in a preheating step 14 and annealed, and then drawn by a pair of drawing rollers 15 and wound up by a windup roller 16. The peripheral speed of drawing rollers 15 is faster by 2 – 10% than that of draft rollers 10 so as to eliminate the slack caused in the previous step.

In view of the foregoing, according to the present invention, the foamed sheet is extruded and cooled to a state where press-fixing is possible, and placed on a synthetic resin supporting plate proceeding at a speed exceeding the extruding speed, but not exceeding 5 times the extruding speed and held at the protrusions so that the thermal shrinkage is relatively low and fine openings are formed to appropriate sizes. For example, when the resulting laminate is used as a drainage material, rain water can pass through it, but soils and sands hardly pass through it.

EXAMPLE

Polypropylene (J-430, trade name, supplied by Mitsui Petrochemical Industries, Ltd., MI 2.5 specific gravity 0.91) was used as a material for the synthetic resin supporting plate and the foamed sheet. The synthetic resin supporting plate was composed of 25 Kg. of the above mentioned polypropylene and 0.415 Kg. of titanium oxide as a white coloring matter, and the sheet to be foamed composed of 25 Kg. of the above mentioned polypropylene, 0.415 Kg. of carbon black, as a coloring matter, 0.15 Kg. of azodicarbonamide as a foaming agent and 0.045 Kg. of calcium stearate as a foaming auxiliary agent.

By using the apparatus shown in FIG. 1, the synthetic resin support sheet was extruded through a T die of 700 mm. in width by an extruder of 65 mm. $\phi$.

The temperature was about 240° C. Then, the supporting plate was subjected to an embossing processing by a vacuum roll to produce protrusions in a form of a frustrum of a cone of 7 mm. high, 10 mm. of diameter of the bottom portion and 5 mm. of diameter of the top portion disposed at a pitch of 17 mm. of the distance between the centers of the protrusions in a zigzag state. The resulting supporting plate was heated to 110° C with a heating roller and drawn with a draft roller at a speed of 1.37 m./min.

On the other hand, a foamed sheet was produced by using an extruder of 50 mm. $\phi$ to extrude a foamed sheet of 700 mm. in width and 1.2 mm. thick at a rate of 19 Kg./hr. at an extrusion temperature of 240° C. The foamed sheet was pressed to and placed on the supporting plate by air pressure of an air knife and simultaneously cooled to about 200° C. At the preheating step, the combined supporting plate and foamed sheet was heated to a temperature ranging from 125° to 140° C to stabilize the dimension resulting in enhancing the strength, and then wound up by a windup roller at a speed of 1.46 m./min. The laminate thus obtained had opening area of 4 –5% and the maximum foam opening size was less than 5 mm. in the major axis.

The water passing-through rate at the perforated surface was 14,000 –26,000 cc./sec./m$^2$ and even when the laminate was used for drainage for a long time, the openings were hardly choked and therefore, the laminate was highly suitable for drainage materials.

According to the present invention, thickness of the foamed sheet extruded is usually 0.6 –3.5 mm., and preferably 1.0 –2.0 mm. The through-holes are preferably 1 –2.5 mm. in diameter (equivalent diameter) and total area of the cross section of the through-holes preferably occupies 3 –5% of the surface area of the foamed sheet. Density of the foamed sheet is usually 0.2 –0.8 g/cc, preferred with 0.45 –0.6 g/cc.

What we claim is:

1. A process for producing a laminate composed of a synthetic resin supporting plate possessing at least two protrusions in a traverse direction and a synthetic resin foamed sheet having fine through-holes and fusion-fixed to the protrusions of said synthetic resin supporting plate which comprises heating a synthetic resin supporting plate possessing at least two protrusions in a traverse direction to a temperature suitable for fusion-fixing, pressing an extruded synthetic resin foamed sheet on the protrusions to form a laminate, and applying a draft to the said laminate at a rate greater than but not exceeding five times the rate at which the synthetic resin foamed sheet is extruded to produce numerous fine through-holes in the synthetic resin foamed sheet.

2. A process according to claim 1 in which the synthetic resin is a thermoplastic synthetic resin.

3. A process according to claim 2 in which the thermoplastic synthetic resin is polypropylene.

4. A process according to claim 1 in which the draft is applied to the laminate at a rate of from 1.1 to 2 times the rate of the synthetic resin foamed sheet.

5. A process according to claim 4 in which the synthetic resin is a thermoplastic synthetic resin.

6. A process according to claim 5 in which the thermoplastic synthetic resin is polypropylene.

* * * * *